(12) United States Patent
Wang et al.

(10) Patent No.: US 10,990,774 B2
(45) Date of Patent: Apr. 27, 2021

(54) OPTICAL COMMUNICATION DEVICE AND SYSTEM, AND CORRESPONDING INFORMATION TRANSMITTING AND RECEIVING METHODS

(71) Applicant: SHAANXI WHYHOW INFORMATION TECHNOLOGY CO., LTD, Xi'an (CN)

(72) Inventors: Xiaodong Wang, Xi'an (CN); Jun Fang, Xi'an (CN); Jiangliang Li, Beijing (CN); Aimin Su, Shanghai (CN)

(73) Assignee: SHAANXI WHYHOW INFORMATION TECHNOLOGY CO., LTD., Xi'an (CN)

( * ) Notice: Subject to any disclaimer, the term of this patent is extended or adjusted under 35 U.S.C. 154(b) by 0 days.

(21) Appl. No.: 16/801,059

(22) Filed: Feb. 25, 2020

(65) Prior Publication Data
US 2020/0193104 A1 Jun. 18, 2020

Related U.S. Application Data

(63) Continuation of application No. PCT/CN2017/099642, filed on Aug. 30, 2017.

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01); *G06K 7/1417* (2013.01)

(58) Field of Classification Search
CPC ............. G06K 7/10722; G06K 7/1413; G06K 7/1417; H04B 10/116
See application file for complete search history.

(56) References Cited

U.S. PATENT DOCUMENTS 8,384,625 B2 * 2/2013 Hajjar ................. H04N 9/3129
345/75.1
2008/0173718 A1 7/2008 Ibe
(Continued)

FOREIGN PATENT DOCUMENTS

| CN | 103916185 A | 7/2014 |
| CN | 103940419 A | 7/2014 |

(Continued)

OTHER PUBLICATIONS

Search Report issued in related Taiwan Application No. 107130175, dated May 11, 2020, 2 pages.
(Continued)

*Primary Examiner* — Seung H Lee
(74) *Attorney, Agent, or Firm* — Bayes PLLC

(57) ABSTRACT

An optical communication device is provided. The optical communication device includes at least one light source and a controller configured to continuously control, by a light source control signal, each of the at least one light source to operate in at least two modes. The at least two modes include a first mode and a second mode. The first mode is used to transfer a first information, and the second mode is used to transfer a second information different from the first information. For any one of the at least one light source, in the first mode, the light source control signal has a first frequency so that a stripe presents in a first image of the light source obtained when the light source is photographed by a CMOS image sensor, and in the second mode, a second image of the light source obtained when the light source is photographed by the CMOS image sensor is substantially free from any stripe.

20 Claims, 7 Drawing Sheets

(56) References Cited

U.S. PATENT DOCUMENTS

2013/0330088 A1* 12/2013 Oshima ............... H04B 10/116
                                                    398/130
2014/0205136 A1    7/2014 Oshima et al.

FOREIGN PATENT DOCUMENTS

| CN | 105187732 A | 12/2015 |
| CN | 105450300 A | 3/2016 |
| CN | 105515657 A | 4/2016 |
| CN | 106209230 A | 12/2016 |
| CN | 106372701 A | 2/2017 |

OTHER PUBLICATIONS

International Search Report and Written Opinion in corresponding International Application No. PCT/CN2017/099642, dated May 15, 2018, 4 pages.
First Office action issued in related Taiwan Application No. 107130175, dated Aug. 19, 2019, 1 page.
Supplemental European Search Report issued in corresponding European Patent Application No. 17 92 3326, dated Feb. 23, 2021, 19 pages.

\* cited by examiner

OPTICAL COMMUNICATION DEVICE AND SYSTEM, AND CORRESPONDING INFORMATION TRANSMITTING AND RECEIVING METHODS

RELATED APPLICATION

The present application is a by-pass continuation application of PCT International Application No. PCT/CN2017/099642 filed Aug. 30, 2017, the entire content of which is incorporated herein by reference.

TECHNICAL FIELD

The present disclosure is directed to the technical field of optical communication, and in particular to an optical communication device, an optical communication system including the optical communication device, and a corresponding information transmitting and receiving method.

BACKGROUND

Bar codes and QR codes have been widely used to encode information. When the bar codes and QR codes are scanned by particular devices or software, corresponding information will be identified. However, bar codes and QR codes can be identified within a limited distance. For example, for a QR code, when it is scanned by a camera of a mobile phone, the mobile phone must be placed at a relatively close distance, usually about 15 times the width of the QR code. Therefore, long-distance identifications (e.g., at a distance equivalent to 200 times the width of the QR code) of bar codes and QR codes usually cannot be implemented, or very large bar codes and QR codes need to be customized. However, this will result in an increase in cost, and in many cases is impossible due to various other restrictions.

CMOS imaging devices are currently widely used which, as shown in FIG. 1, include an array of image-sensitive cells (also referred to as image sensors) and some other elements. The image sensor array may be a photodiode array, and each image sensor corresponds to one pixel. Each column of image sensors corresponds to a column amplifier. An output signal from the column amplifier is transmitted to an A/D converter (ADC) for analog-to-digital conversion and then output through an interface circuit. For any image sensor in the image sensor array, the image sensor is reset at the beginning of an exposure, and the signal value is read out at the end of the exposure. In the CMOS imaging device, the readout of data is serial, so resetting/exposure/reading can only be performed sequentially row by row in a pipelined manner, and one image is synthesized after all rows of the image sensor array are processed. Therefore, the whole CMOS image sensor array is actually exposed row by row (in some cases, the CMOS image sensor array may also be exposed in multiple rows each time), resulting in a short delay among rows. Due to this short delay, when a light source flashes at a certain frequency, some undesirable stripes will appear on images photographed by the CMOS imaging device to affect the photographing effect.

Theoretically, it is possible to use stripes on the images photographed by the CMOS imaging device to transfer information (similar to bar codes), and it has been attempted to transfer as much information as possible by using the stripes. However, it is generally required that the CMOS imaging device is as close as possible to the light source and preferably always located at a nearly fixed distance. Moreover, precise time synchronization, precise identification of the boundary of each stripe, precise detection of the width of each stripe or the like are also required. Because the stability and reliability of the CMOS imaging device are unsatisfactory in practice, the CMOS imaging device has not been widely used.

SUMMARY

In order to realize long-distance identification of information, an aspect of the present disclosure relates to an optical communication device. The optical communication device includes at least one light source, and a controller configured to control each of the at least one light source to operate in at least two modes. The at least two modes include a first mode and a second mode. The first mode is used to transfer a first information, and the second mode is used to transfer a second information different from the first information. For any one of the at least one light source, an attribute of light emitted by the light source operating in the first mode changes at a first frequency so that a stripe is presented in a first image of the light source obtained when the light source is photographed by a CMOS image sensor; and the light emitted by the light source operating in the second mode does not present any stripe in a second image of the light source obtained when the light source is photographed by the CMOS image sensor.

Another aspect of the present disclosure relates to a method for transmitting information using a light source. The method includes continuously controlling the light source to operate in a first mode or a second mode according to information to be transmitted. The first mode is used to transfer a first information, and the second mode is used to transfer a second information different from the first information. An attribute of light emitted by the light source operating in the first mode changes at a first frequency so that a stripe is presented in a first image of the light source obtained when the light source is photographed by a CMOS image sensor; and the light emitted by the light source operating in the second mode does not present any stripe in a second image of the light source obtained when the light source is photographed by the CMOS image sensor.

Another aspect of the present disclosure relates to a device for transmitting information using a light source. The device includes a controller for controlling the light source. The controller is configured to implement the above-described method for transmitting information using a light source.

Another aspect of the present disclosure relates to a tangible non-transitory storage medium storing computer programs that, when executed, can implement the above-described method for transmitting information using a light source.

Another aspect of the present disclosure relates to a method for receiving information transmitted by the above-described optical communication device. The method includes obtaining an image of a light source by a CMOS image sensor. The method further includes determining whether there is a stripe in a portion of the image corresponding to the light source; and, determining, according to the presence or absence of the stripe, whether the light source transmits a first information or a second information different from the first information.

Another aspect of the present disclosure relates to a device for receiving information transmitted by the above-described optical communication device. The device includes a CMOS image sensor, a processor and a memory. The memory stores computer programs that, when executed by the processor, can implement the above-described method for receiving information transmitted by the optical communication device.

Another aspect of the present disclosure relates to a tangible non-transitory storage medium storing computer programs that, when executed, can implement the above-described method for receiving information transmitted by the optical communication device.

Another aspect of the present disclosure relates to an optical communication system. The optical communication system includes at least one light source, and a controller configured to control each of the at least one light source to operate in at least two modes. The at least two modes include a first mode and a second mode. The first mode is used to transfer a first information and the second mode is used to transfer a second information different from the first information. For any one of the at least one light source, an attribute of light emitted by the light source operating in the first mode changes at a first frequency. The optical communication system further includes an apparatus including a CMOS image sensor. The apparatus is configured to photograph the at least one light source. A stripe is presented in a first image of the light source obtained by the apparatus when the light source operates in the first mode, and a second image of the light source obtained by the apparatus when the light source operates in the second mode is substantially free from any stripe.

Another aspect of the present disclosure relates to an optical communication method. The optical communication method includes controlling a light source to operate in a first mode or a second mode according to information to be transmitted. The first mode is used to transfer a first information and the second mode is used to transfer a second information different from the first information. An attribute of light emitted by the light source operating in the first mode changes at a first frequency so that a stripe is presented in a first image of the light source obtained when the light source is photographed by a CMOS image sensor, and the light emitted by the light source operating in the second mode does not present any stripe in a second image of the light source obtained when the light source is photographed by the CMOS image sensor. The optical communication method further includes obtaining multiple successive images of the light source by the CMOS image sensor; determining whether there is a stripe in each image of the light source; and determining, according to the presence or absence of the stripe, whether the light source transmits a first information or a second information different from the first information.

Another aspect of the present disclosure relates to an optical communication device. The optical communication device includes at least one light source and a controller configured to control each of the at least one light source to operate in at least two modes. The at least two modes include a first mode and a second mode. The first mode is used to transfer a first information, and the second mode is used to transfer a second information different from the first information. For any one of the at least one light source, an attribute of light emitted by the light source operating in the first mode changes at a first frequency so that a first stripe is presented in a first image of the light source obtained when the light source is photographed by a CMOS image sensor; and the attribute of the light emitted by the light source operating in the second mode changes at a second frequency so that a second stripe different from the first stripe is presented in a second image of the light source obtained when the light source is photographed by the CMOS image sensor.

Another aspect of the present disclosure relates to a method for transmitting information using a light source. The method includes controlling the light source to operate in a first mode or a second mode according to information to be transmitted. The first mode is used to transfer a first information, and the second mode is used to transfer a second information different from the first information. An attribute of light emitted by the light source operating in the first mode changes at a first frequency so that a first stripe is presented in a first image of the light source obtained when the light source is photographed by a CMOS image sensor. The attribute of the light emitted by the light source operating in the second mode changes at a second frequency so that a second stripe different from the first stripe is presented in a second image of the light source obtained when the light source is photographed by the CMOS image sensor.

BRIEF DESCRIPTION OF THE DRAWINGS

The embodiments of the present invention will be further described below with reference to the accompanying drawings, in which.

DETAILED DESCRIPTION OF THE PRESENT INVENTION

To make the objectives, technical solutions and advantages of the present disclosure clearer, the embodiments will be further described below in detail by specific embodiments with reference to the accompanying drawings.

An embodiment of the present disclosure relates to an optical communication device which can transmit different information by emitting different light. The optical communication device is also referred to as an "optical tag" herein, and both of which are used interchangeably throughout the present application. The optical communication device includes a light source and a controller. The controller is configured to control the light source to operate in two or more modes. The two or more modes include a first mode and a second mode. In the first mode, an attribute of light emitted by the light source changes at a first frequency to transfer a first information. In the second mode, the attribute of the light emitted by the light source changes at a second frequency or does not change to transfer a second information different from the first information.

In the present application, the attribute of light refers to any attribute that can be identified by the CMOS imaging device. For example, the attribute may be an attribute perceptible to human eyes such as the intensity, color and wavelength of light, or other attributes imperceptible to human eyes such as the change in intensity of electromagnetic wavelength, color or wavelength beyond the visible range of human eyes, or any combination of above attributes. Therefore, the change of the attribute of light may be a change of a single attribute, or may be a change of the combination of two or more attributes. When the intensity of light is selected as the attribute, the change of the attribute of light can be realized simply by selectively turning on and off the light source. Hereinafter, for simplicity, the attribute of light is changed by turning on and off the light source. However, other approaches for changing the attribute of light are also contemplated. In some embodiments, the attribute of the light changing at the first frequency in the first mode may be the same as the attribute of the light changing at the second frequency in the second mode. In some alternative embodiments, the attribute of the light changing in the first mode may be different from the attribute of the light changing in the second mode.

Figure 1:
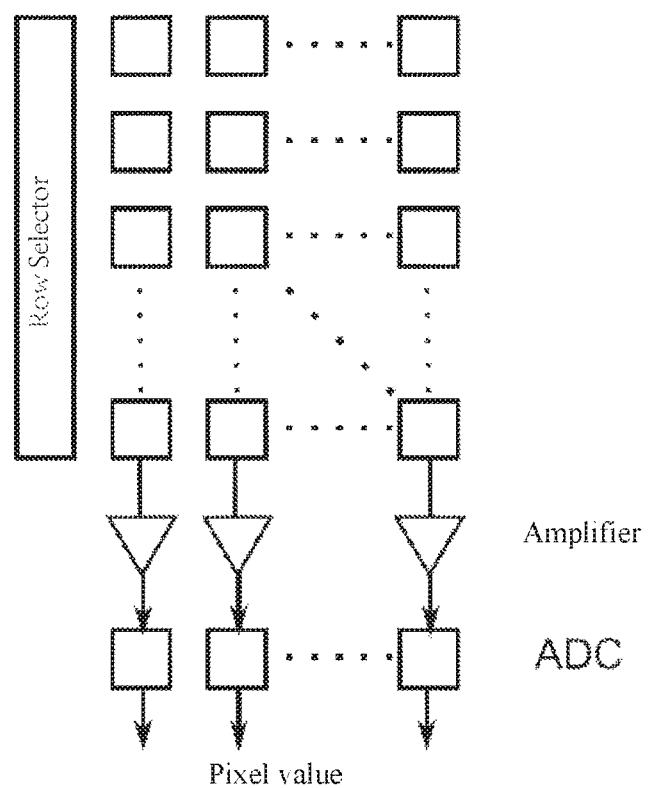
FIG. 1 is a schematic diagram of a CMOS imaging device, according to an embodiment of the present disclosure.
Figure 2:
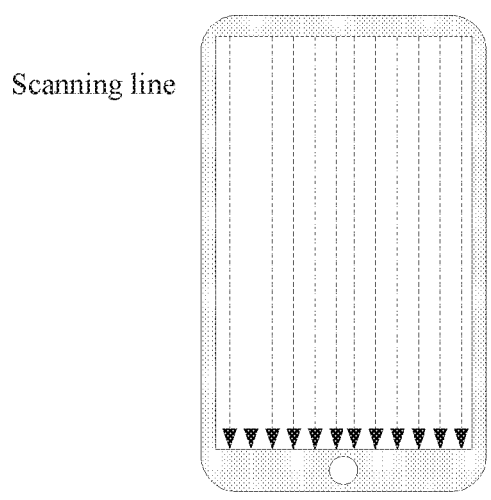
FIG. 2 is a directional diagram of acquiring images by the CMOS imaging device, according to an embodiment of the present disclosure.

When operating in the first mode or the second mode, the light source may be imaged by a CMOS imaging device or an apparatus with the CMOS imaging device (e.g., a mobile phone, a tablet computer, a pair of intelligent glasses, etc.). Hereinafter, the description will be given by using a mobile phone as the CMOS imaging device, as shown in FIG. 2. The row scanning direction of the mobile phone is shown as a vertical direction in FIG. 2. However, it should be understood by those skilled in the art that the row scanning direction may also be a horizontal direction according to different underlying hardware configurations.

The light source may be a light source in various forms as long as a certain attribute perceptible to the CMOS imaging device can change at a different frequency. For example, the light source may be an LED lamp, an array consisting of multiple LED lamps, a display screen or a portion thereof, or even, an illumination area of light (e.g., an illumination area of light on a wall) may also be used as a light source. The light source may be in various shapes, for example, a circular shape, a square shape, a rectangular shape, a strip shape, an L-shape or the like. The light source may include various common optical devices, for example, a light guide plate, a light softening plate, a diffuser or the like. In an embodiment, the light source may be a two-dimensional array consisting of multiple LED lamps. In some embodiments, one dimension of the two-dimensional array may be longer than the other. In some embodiments, the ratio of the two dimensions may be about 6-12:1. For example, the LED lamp array may consist of multiple LED lamps that are arranged in one column. When emitting light, the LED lamp array may appear as a substantially rectangular light source, and the operation of the light source is controlled by the controller.

Figure 3:
FIG. 3 shows a light source according to an embodiment of the present disclosure.
Figure 4:
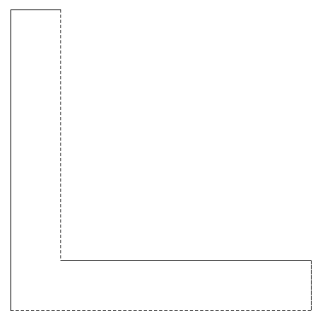
FIG. 4 shows a light source according to another embodiment of the present disclosure.

FIG. 3 shows a light source according to an embodiment of the present disclosure. When the light source shown in FIG. 3 is imaged by a CMOS imaging device, the long sides of light source shown in FIG. 3 may be perpendicular or substantially perpendicular to the row direction of the CMOS imaging device (e.g., the row scanning direction of the mobile phone shown in FIG. 2), so that as many stripes as possible are imaged under the same conditions. However, the user sometimes does not know the row scanning direction of the mobile phone. In order to ensure that the mobile phone can realize identification in various attitudes and that the maximum identification distance can be realized in a vertical screen mode or a horizontal screen mode, the light source may be a combination of multiple rectangles, for example, an L-shaped light source shown in FIG. 4.

In another embodiment, the light source may not be limited to a planar light source, but may be implemented as a stereoscopic light source, for example, a strip-shaped cylindrical light source, a cubic light source or the like. For example, the light source may be placed on a square or suspended at a substantially central position of an indoor place (e.g., a dining room, a conference room, etc.), so that nearby users in various directions can photograph this light source through mobile phones to obtain the information transferred by this light source.

Figure 5:
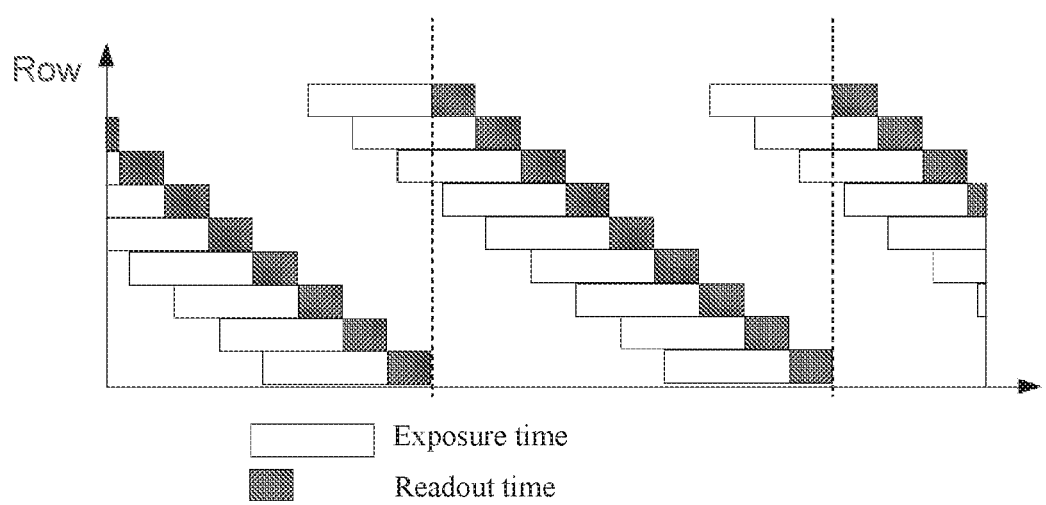
FIG. 5 is an imaging sequence diagram of the CMOS imaging device, according to an embodiment of the present disclosure.

FIG. 5 shows an imaging sequence diagram of the CMOS imaging device, where each row corresponds to one row of sensors of the CMOS imaging device. Imaging of each row of the CMOS imaging sensor array mainly includes two stages (i.e., exposure time and readout time). The exposure times of some rows may be overlapped, but the readout times will not be overlapped.

Although only a few rows are schematically shown in FIG. 5, an actual CMOS imaging device generally has thousands of rows of sensors depending upon different resolutions. For example, at a resolution of 1080 p, the CMOS imaging device has 1920×1080 pixels, where the numeral 1080 represents 1080 scanning rows and the numeral 1920 represents 1920 pixels per row. At the resolution of 1080 p, the readout time for each row is approximately 8.7 µs (i.e., $8.7 \times 10^{-6}$ s).

Figure 6:
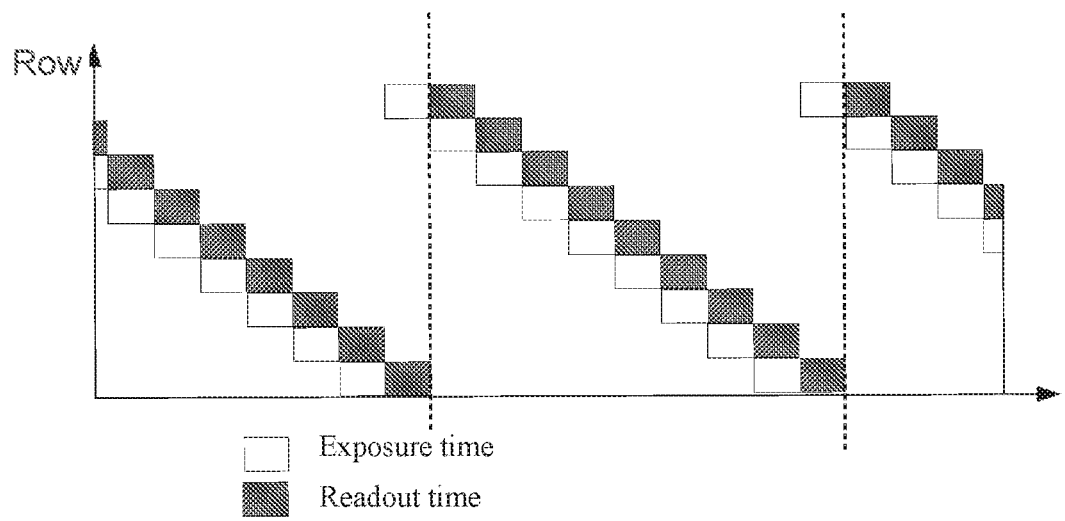
FIG. 6 is another imaging sequence diagram of the CMOS imaging device, according to another embodiment of the present disclosure.

If there are many overlaps between the exposure times for adjacent rows due to a too long exposure time, visible transition stripes may appear during imaging. For example, there are multiple pixel rows with different gray scales between a pure black pixel row and a pure white pixel row. In the present disclosure, it is desirable to show pixel rows as clearly as possible. Therefore, the exposure time of the CMOS imaging device (e.g., the mobile phone) is set or adjusted (e.g., by an APP installed in the mobile phone) to implement a relatively short exposure time. In an embodiment, the exposure time may be approximately equal to or less than the readout time for each row. Taking a resolution of 1080 p as an example, the readout time for each row is approximately 8.7 μs. In this case, it may be considered to adjust the exposure time of the mobile phone to about 8.7 μs or less. FIG. 6 shows an imaging sequence diagram of the CMOS imaging device in this case. In this case, the exposure times for the rows generally do not overlap or only nominally overlap, so that stripes with clear boundaries can be obtained during imaging, which can be identified more easily. It is to be noted that FIG. 6 merely shows one embodiment of the present disclosure, and a longer (e.g., equal to or less than two times, three times, four times, etc., of the readout time for each row) or shorter exposure time is also feasible. For example, during the imaging process of stripe images shown in FIGS. 12 and 13 in the present application, the readout time for each row is approximately 8.7 μs and the set exposure time for each row is 14 μs. Additionally, in order to show stripes, the duration of one cycle of the light source may be set to be about two or more times the exposure time, preferably about four or more times the exposure time.

Figure 7:
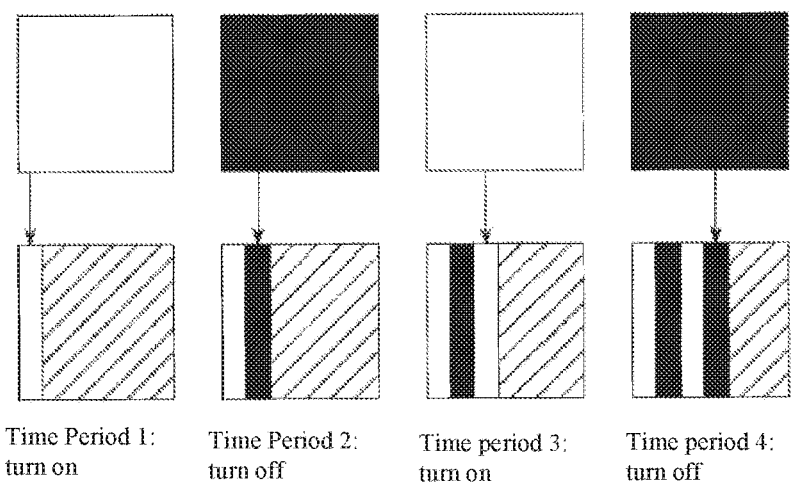
FIG. 7 shows a series of images of the light source acquired by the CMOS image device in different stages when the light source operates in a first mode, according to another embodiment of the present disclosure.

FIG. 7 shows a series of images of the light source acquired by the CMOS imaging device in different stages when the controller controls the light source to operate in a first mode. In the first mode, the attribute of light emitted by the light source is changed at a certain frequency. In this embodiment, the change of the attribute of light is realized by turning on and off the light source.

The upper part of FIG. 7 shows the change of the light source in different stages, and the lower part shows the corresponding images of the light source acquired by the CMOS imaging device in these different stages, where the row direction of the CMOS imaging device is a vertical direction and the scanning is performed from left to right. Since the image is obtained by the CMOS imaging device scanning the light source row by row, when a high-frequency flicker signal is photographed, the stripe shown in the lower part of FIG. 7 will be formed in a portion of the obtained image corresponding to the imaging position of the light source. Specifically, in time period 1, the light source is turned on, and the left-most scanning row exposed in this period of time will present a bright stripe. In time period 2, the light source is turned off, and the scanning row exposed in this period of time will present a dark stripe. In time period 3, the light source is turned on, and the scanning row exposed in this period of time present a bright stripe. In time period 4, the light source is turned off, and the scanning row exposed in this period of time will present a dark stripe.

Figure 8:
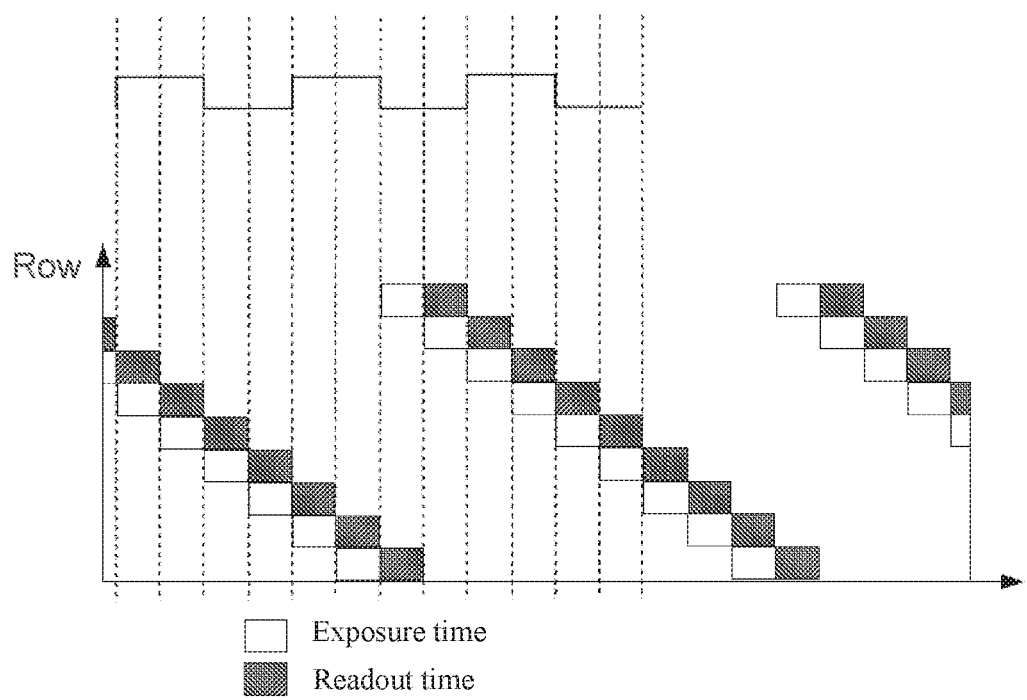
FIG. 8 shows an imaging sequence diagram of the CMOS imaging device when the light source operates in the first mode, according to an embodiment of the present disclosure.

The width of presented stripes may be adjusted by setting the flicker frequency of the light source or setting the duration of each turn-on and turn-off of the light source. A longer duration of turn-on and turn-off generally corresponds to a wider stripe. For example, in the case shown in FIG. 6, if the duration of each turn-on and turn-off of the light source is set to be approximately equal to the exposure time for each row of the CMOS imaging device (the exposure time may be set by an APP installed in the mobile phone or set manually), stripes having a width of only one pixel may appear during imaging. In order to realize the long-distance identification of an optical tag, the stripes should be as narrow as possible. However, in practice, due to light interference, synchronization and other reasons, the stripes having a width of only one pixel are not stable or difficult to identify. Therefore, in order to improve the stability of identification, stripes having a width of two pixels may be implemented in some embodiments. For example, in the case shown in FIG. 6, the duration of each turn-on and turn-off of the light source may be set to be approximately equal to about 2 times the exposure time for each row of the CMOS imaging device so as to realize stripes having a width of about two pixels, as specifically shown in FIG. 8. The signal in the upper part of FIG. 8 is a light source control signal having a high level corresponding to the turn-on of the light source and a low level corresponding to the turn-off of the light source. In the embodiment shown in FIG. 8, the duty cycle of the light source control signal is set to be about 50% and the exposure time for each row is set to be approximately equal to the readout time for each row. However, it should be understood by those skilled in the art that other settings are also feasible as long as distinguishable stripes can be presented. For simplicity of description, the light source and the CMOS imaging device are synchronized in FIG. 8, so that the time when the light source is turned on and the time when the light source is turned off approximately correspond to the start or end time of the exposure time for a certain row of the CMOS imaging device. However, it should be understood by those skilled in the art that, visible stripes can be imaged by the CMOS imaging device even if the light source and the CMOS imaging device are not synchronized as in FIG. 8. In this case, there may be some transitory stripes, but there is always a row exposed when the light source is turned off (i.e., the darkest stripe) and a row exposed when the light source is turned on (i.e., the brightest stripe) which are separated by one pixel. The change in brightness (i.e., stripes) of the pixel rows can be easily detected (for example, by comparing the brightness or gray scale of some pixels in the imaging area of the light source). In some embodiments, there is no row exposed when the light source is turned off (i.e., the darkest stripe) and no row exposed when the light source is turned on (i.e., the brightest stripe). Instead, the turn-on time $t1$ of the light source is less than a certain time length or accounts for a small proportion of the exposure time of a row (resulting in a darker stripe) and the turn-on time $t2$ of the light source is greater than a certain time length or accounts for a large proportion of the exposure time of a row (resulting in a brighter stripe) in. As long as $t2-t1$ is greater than a threshold of the difference between the brighter and darker stripes (e.g., 10 μs) or $t2/t1$ is greater than a threshold of the ratio of the brighter and darker stripes (e.g., 2), the change in brightness of the pixel rows can also be detected. The threshold of the difference between the brighter and darker stripes and the threshold of the ratio of the brighter and darker stripes are determined based on the luminous intensity of the optical tag, the properties of the photosensitive device, the photographing distance or the like. It should be understood by those skilled in the art that other thresholds are also feasible as long as the presented stripes can be distinguished by a computer. During the identification of stripes, the information (e.g., binary data 0 or 1) transferred by the light source at this time can be determined.

A method for identifying stripes according to an embodiment of the present disclosure is performed as follows: an image of an optical tag is obtained, and an imaging area of a light source is segmented in a projection manner; stripe images and stripe-free images in different configurations (e.g., at different distances, different light source flicker frequencies or the like) are acquired; all the acquired images are uniformly normalized to a particular size, e.g., 64*16 pixels; each pixel feature is extracted as an input feature to construct a machine learning classifier; and, dichotomous discrimination is performed to determine whether it is a stripe image or a substantially stripe-free image. The stripe identification can also be performed by any other methods known in the art, and these methods will not be described here.

For a strip-shaped light source having a length of 5 cm, when the light source is photographed at a resolution of 1080 p and a distance of 10 m (that is, the distance is 200 times the length of the light source) by a mobile phone available on the market, the strip-shaped light source will occupy about 6 pixels in its lengthwise direction. If the width of each stripe is 2 pixels, at least one visible stripe will appear within the width range of the 6 pixels, and the at least one visible stripe can be easily identified. If a higher resolution is set or a larger distance (for example, the distance is 300 to 400 times the length of the light source) is employed through optical zooming, stripes can also be identified.

Figure 9:
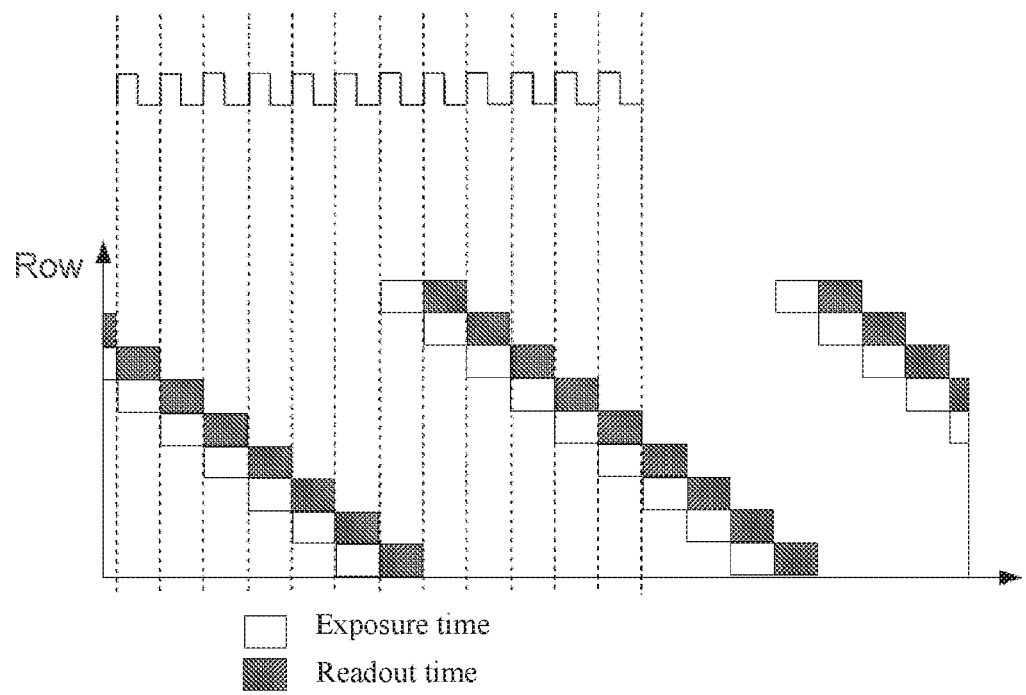
FIG. 9 shows an imaging sequence diagram of the CMOS imaging device when the light source operates in a second mode, according to an embodiment of the present disclosure.

The controller may be configured to control the light source to operate in the second mode. In an embodiment, in the second mode, the attribute of light emitted by the light source is changed at a frequency different from that in the first mode. For example, the change of the attribute of light is realized by turning on and off the light source. In an embodiment, compared with the first mode, the frequency at which the light source is turned on and off can be increased by the controller. In the case shown in FIG. 6, the light source may be configured to be turned on and off for at least one time within the exposure time for each row of the CMOS imaging device. FIG. 9 shows a case where the light source is turned on and off for only one time within the exposure time for each row, where the signal in the upper part of FIG. 9 is a light source control signal having a high level corresponding to the turn-on of the light source and a low level corresponding to the turn-off of the light source. Since the light source will be turned on and off for one time in the same way within the exposure time for each row and the exposure of each row is associated with a same exposure intensity and same amount of energy, there is no significant difference in pixel values among the rows in the image of the light source, and there are substantially no stripe in the image. An image is substantially free from any stripe (or referred to as no substantially no stripe in the image) if no visible stripe can be identified from the image. It should be understood by those skilled in the art that a higher turn-on or turn-off frequency is also feasible. Additionally, for simplicity of description, the light source and the CMOS imaging device are synchronized in FIG. 9, so that the time when the light source is turned on approximately corresponds to the start time of the exposure time for a certain row of the CMOS imaging device. However, it should be understood by those skilled in the art, homogeneity in pixel values among the rows of the light source image can be realized even if the light source and the CMOS imaging device are not synchronized as in FIG. 9, such that there is substantially no stripe in the image. When stripes are not identified, the information (e.g., binary data 1 or 0) transferred by the light source at this time can be determined. For human eyes, due to the persistence of vision, any flicker will not be observed by human eyes when the light source of the present disclosure operates in the first mode and the second mode. Additionally, in order to avoid flickers that may be observed by human eyes during the switchover between the first mode and the second mode, the duty cycle in the first mode and the duty ratio in the second mode may be set to be approximately equal, which result in an approximately equal luminous flux in different modes.

In another embodiment, in the second mode, DC power can be provided to the light source so that the light source emits light with an attribute that basically does not change. Accordingly, an image of the light source obtained when the light source is photographed by the CMOS image sensor is substantially free from any stripe. Additionally, in this case, it is also possible to realize the approximately equal luminous flux in different modes, thus avoiding flickers that may be observed by human eyes during the switchover between the first mode and the second mode.

Figure 10:
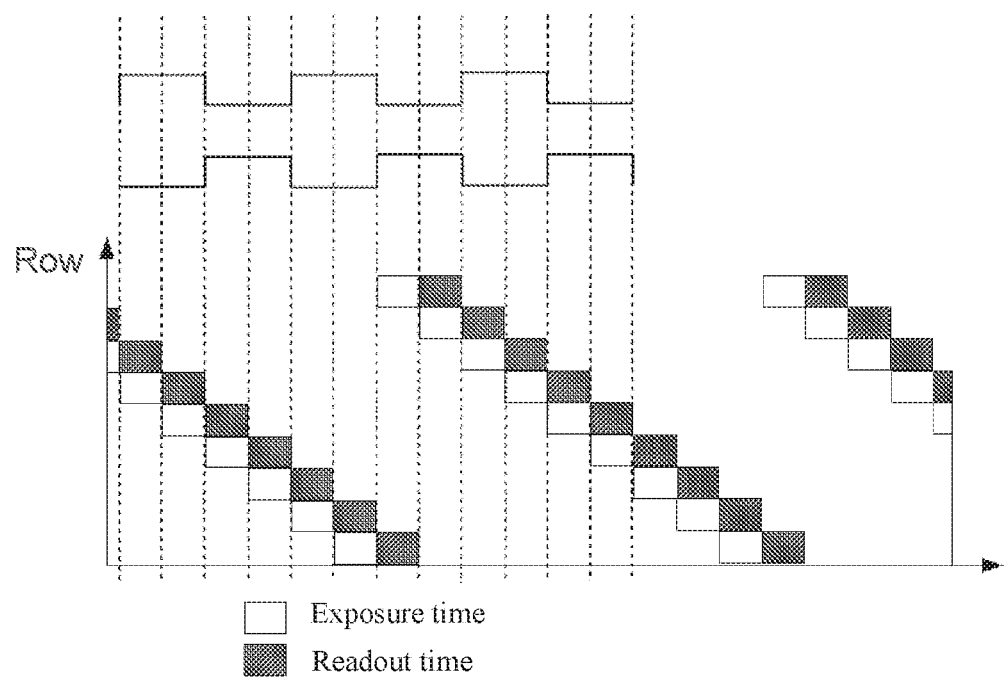
FIG. 10 shows another imaging sequence diagram of the CMOS imaging device when the light source operates in the first mode, according to another embodiment of the present disclosure.

FIG. 8 shows an embodiment in which stripes are presented by changing the intensity of light emitted by the light source (for example, by turning on and off the light source). In another embodiment, as shown in FIG. 10, it is also possible that stripes are presented by changing the wavelength or color of light emitted by the light source. In the embodiment shown in FIG. 10, the light source includes a red light source capable of emitting red light and a blue light source capable of emitting blue light. Two signals in the upper part of FIG. 10 include a red light control signal and a blue light control signal, respectively, where a high level of each control signal corresponds to the turn-on of the corresponding light source and a low level corresponds to the turn-off of the corresponding light source. The phases of the red light control signal and the blue light control signal are offset by 180°, that is, the levels of the two signals are opposite. The light source can alternately emit red light and blue light according to the red light control signal and the blue light control signal, so that red and blue stripes can be presented when the light source is imaged by the CMOS imaging device.

By determining whether there are stripes in the portion of an image photographed by the CMOS imaging device corresponding to the light source, the information (e.g., binary data 1 or 0) transferred by each image can be determined. Further, by photographing multiple successive images of the light source by the CMOS imaging device, an data sequence consisting of binary data 1 and 0 can be determined, so that the information is transferred from the light source to the CMOS imaging device (e.g., the mobile phone). In an implementation, when multiple successive image frames of the light source are photographed by the CMOS imaging device, the controller may operate to control the switching time interval between operating modes of the light source to be equal to the time length of imaging one complete frame by the CMOS imaging device, thereby realizing the frame synchronization of the light source and the imaging device, i.e., transmitting 1 bit of information per frame. At a photographing speed of 30 frames per second, 30 bits of information can be transferred per second, and the encoding space reaches $2^{30}$. For example, the information may include a starting frame label (frame header), an ID of the optical tag, a password, a verification code, URL information, address information, a timestamp or different combinations thereof, or the like. The above information may be structured in a particular order to form a data packet structure. Once a complete data packet structure is received, this data packet structure is regarded as a set of complete data (a data packet), so that data reading and verification can be performed on the data packet structure. The data packet structure according to an embodiment of the present disclosure is shown in the following table:

| Frame header | Attribute (8bit) | Data bit (32bit) | Check bit (8bit) | Frame trailer |
| --- | --- | --- | --- | --- |

In the above description, the information transferred by each image is determined by determining whether there is a stripe at the position of the light source in this image. In other embodiments, different information transferred by each image can also be determined by identifying different stripes at the imaging position of the light source in this image. For example, in the first mode, the attribute of light emitted by the light source changes at a first frequency so that a first stripe is presented on an image of the light source obtained when the light source is photographed by a CMOS image sensor. In the second mode, the attribute of the light emitted by the light source changes at a second frequency so that a second stripe different from the first stripe is presented on an image of the light source obtained when the light source is photographed by the CMOS image sensor. For example, the difference between the stripes may include different widths, colors, brightness or any combination thereof as long as the difference can be identified.

Figure 11:
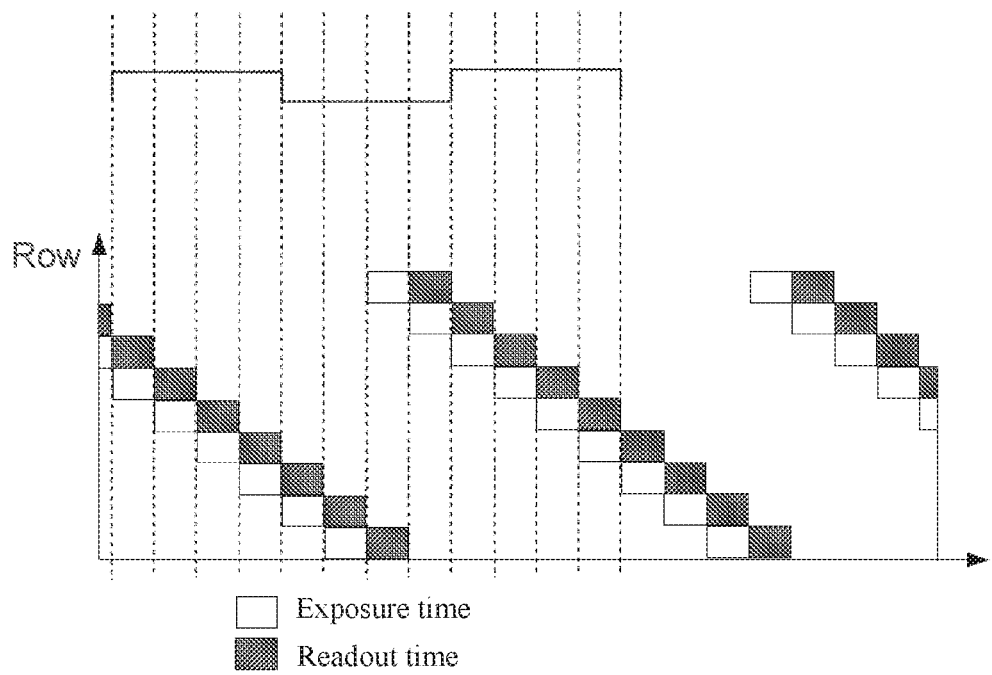
FIG. 11 shows another imaging sequence diagram of the CMOS imaging device for realizing stripes different from that in FIG. 8 according to another embodiment of the present disclosure.

In an embodiment, stripes with different widths can be realized based on different attribute change frequencies. For example, in the first mode, the light source may operate in the manner shown in FIG. 8, so that a first stripe having a width of about two pixels is realized; and, in the second mode, the duration of the high level and the duration of the low level of the light source control signal shown in FIG. 8 in each cycle are modified to be two times the original duration, as specifically shown in FIG. 11, so that a second stripe having a width of about four pixels is realized.

In another embodiment, stripes with different colors can be realized. For example, the light source may be configured to include a red light source capable of emitting red light and a blue light source capable of emitting blue light. In the first mode, the blue light source may be turned on, and the red light source is allowed to operate in the manner shown in FIG. 8, so that red-black stripes are realized; and, in the second mode, the red light source can be turned off, and the blue light source is allowed to operate in the manner shown in FIG. 8, so that blue-black stripes are realized. In the above embodiment, the red-black stripes and the blue-black stripes are realized at the same change frequency in the first mode and the second mode. However, it should be understood that different attribute change frequencies can also be adopted in the first mode and the second mode.

Additionally, in some embodiments, more than two types of information can be further transmitted by realizing more than two types of stripes in the image. For example, in the above embodiment in which the light source includes a red light source and a blue light source, the light source can be further configured to operate in a third mode. In the third mode, the red light source and the blue light source are controlled in the manner shown in FIG. 10 to realize red-blue stripes. i.e., a third information. In some embodiments, another information (i.e., a fourth information) can be further transferred by presenting substantially no stripe.

Figure 12:
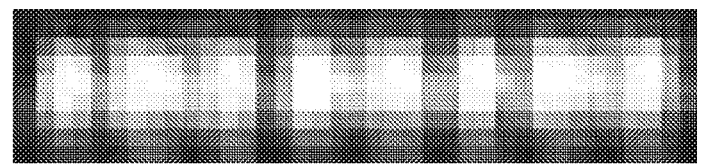
FIGS. 12-13 show two stripe images of the light source obtained under different settings, according to an embodiment of the present disclosure.
Figure 13:
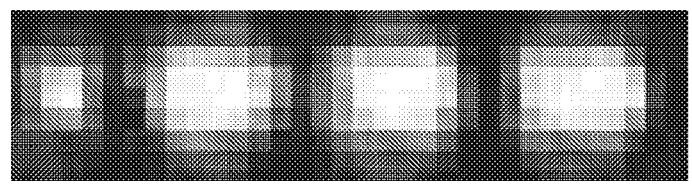
Figure 14:
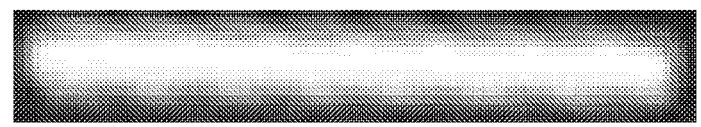
FIG. 14 shows the obtained stripe-free image of the light source according to another embodiment of the present disclosure.

FIG. 12 shows stripes in an exemplary image of an LED light obtained by an imaging device having a resolution of 1080 p. The LED light operates at a flicker frequency of 16000 times per second (the duration of each cycle is 62.5 µs, where the turn-on duration and the turn-off duration are respectively about 31.25 µs). The exposure time for each row is set to be 14 µs. It can be seen from FIG. 12 that stripes having a width of about 2 to 3 pixels are presented. FIG. 13 shows stripes in an exemplary image obtained of a LED light where the flicker frequency of the LED lamp in FIG. 12 is adjusted to be 8000 times per second with other conditions unchanged (the duration of each cycle is 125 is, where the turn-on duration and the turn-off duration are respectively about 62.5 µs). It can be seen from FIG. 13 that stripes having a width of about 5 to 6 pixels are presented. FIG. 14 shows that there are substantially no stripes in the image obtained where the flicker frequency of the LED lamp in FIG. 12 is adjusted to be 64000 times per second with other conditions unchanged (the duration of each cycle is 15.6 µs, where the turn-on duration and the turn-off duration are respectively about 7.8 µs). This is because the exposure time of 14 µs for each row generally consists of one turn-on duration and one turn-off duration.

Figure 15:
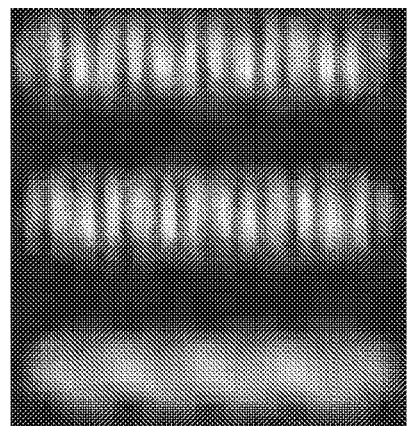
FIG. 15 is an image of an optical tag using three independent light sources according to an embodiment of the present disclosure.

Although only one light source is described above, it is contemplated in some embodiments, two or more light sources may also be used. The controller can individually control the operation of each light source. FIG. 15 shows an image of an optical tag using three independent light sources according to an embodiment of the present disclosure. As shown in FIG. 15, stripes appear at the positions of two light sources; and, substantially no stripe appears at the imaging position of the remaining light source. The image of the group of light sources can be used to transfer information, for example, binary data 110.

Figure 16:
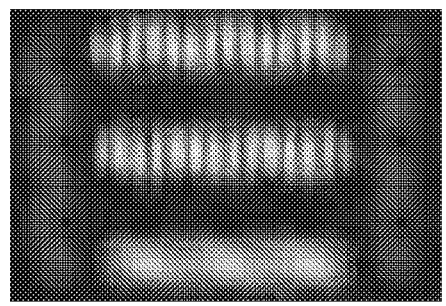
FIG. 16 is an image of an optical tag including positioning markers according to an embodiment of the present disclosure.

In an embodiment, the optical tag may also include one or more positioning markers located near the light source that transfers information. For example, the positioning marker may be a light in a particular shape or color. For example, the light may be constantly turned on during operation. The positioning marker can help the user of the CMOS imaging device (e.g., the mobile phone) to easily find the optical tag. Additionally, when the CMOS imaging device is configured to photograph the optical tag, the positioning marker is visible in the image and easy to identify. Therefore, one or more positioning markers arranged near the light source that transfers information can also help the mobile phone to quickly determine the position of the light source that transfers information, thus helping in identifying whether there are stripes in the portion of the image corresponding to the light source. In an embodiment, in the process of identifying the presence of stripes, the positioning marker in the image can be first identified to determine the approximate position of the optical tag in the image. After the positioning marker is identified, one or more areas in the image can be determined based on the relative position between the positioning marker and the light source that transfers information. The one or more areas contain the image of the light source that transfers information. Then, these areas can be identified to determine whether there exist stripes and/or what kind of stripes exists. FIG. 16 is an image of the optical tag including positioning markers according to an embodiment of the present disclosure, including three horizontally-arranged light sources that transfer information, and two positioning identification lights vertically arranged on two sides of the light sources that transfer information.

In an embodiment, the optical tag may include an ambient light detection circuit that may be used to detect the intensity of the ambient light. The controller can adjust, based on the detected intensity of the ambient light, the intensity of light emitted by the light source when turned on. For example, when the intensity of the ambient light is relatively high (e.g., in the daytime), the intensity of light emitted by the light source is set relatively high; and, when the intensity of the ambient light is relatively low (e.g., at night), the intensity of light emitted by the light source is set relatively low.

In an embodiment, the optical tag may include an ambient light detection circuit that may be used to detect the frequency of the ambient light. The controller can adjust, based on the detected frequency of the ambient light, the frequency of light emitted by the light source when turned on. For example, when there is a light source that flashes at the same frequency as the ambient light, the light emitted by the light source is switched to a different frequency.

The disclosed optical tag can be identified at a distance of at least 200 times the size of the optical tag. The long-distance identification capability is particularly suitable for outdoor identification. By taking an identification distance of 200 times as an example, for a light source on the street in a length of 50 cm, a person within 100 m from this light source can interact with this light source through a mobile phone. Additionally, the disclosed embodiments do not require that the CMOS imaging device is located at a fixed distance from the optical tag, or the time synchronization between the CMOS imaging device and the optical tag. The accurate detection of the boundary and width of each stripe is also not required. Therefore, the disclosed CMOS imaging device has extremely high stability and reliability for information transmission in practice.

In this specification, references to "various embodiments", "some embodiments", "an embodiment", "embodiments" or the like mean that particular features, structures or properties described in conjunction with the embodiment/embodiments are included in at least one embodiment. Therefore, the phrase "in various embodiments", "in some embodiments", "in an embodiment", "in embodiments" or the like appears in various locations throughout this specification and unnecessarily refers to a same embodiment. Additionally, particular features, structures or properties can be combined in one or more embodiments in any suitable way. Therefore, particular features, structures or properties shown or described in conjunction with an embodiment can be completely or partially combined with the features, structures or properties in one or more other embodiments without limitation, as long as the combination is not illogical or inoperative. Additionally, the elements in the accompanying drawings of the present application are merely for illustrative purpose and are not drawn to scale.

Several aspects of at least one embodiment have been described, but it should be understood that various alterations, modifications and improvements are apparent to those skilled in the art. Other embodiments will be apparent to those skilled in the art from consideration of the specification and practice of the disclosed system and related methods. It is intended that the specification and examples be considered as exemplary only, with a true scope being indicated by the following claims and their equivalents.

The invention claimed is:

1. An optical communication device, comprising:
   at least one light source; and
   a controller configured to continuously control, by a light source control signal, each of the at least one light source to operate in at least two modes, the at least two modes comprising a first mode and a second mode, wherein the first mode is used to transfer a first information, and the second mode is used to transfer a second information different from the first information,
   wherein, for any one of the at least one light source, in the first mode, the light source control signal has a first frequency so that a stripe presents in a first image of the light source obtained when the light source is photographed by a CMOS image sensor, and in the second mode, a second image of the light source obtained when the light source is photographed by the CMOS image sensor is free from any visible stripe.

2. The optical communication device according to claim 1, wherein, in the second mode, the light source control signal has a second frequency different from the first frequency.

3. The optical communication device according to claim 2, wherein the second frequency is greater than the first frequency.

4. The optical communication device according to claim 2, wherein, in the first mode, the light source control signal controls the light source to turn on and off at the first frequency, and, in the second mode, the light source control signal controls the light source to turn on and off at the second frequency.

5. The optical communication device according to claim 1, wherein the light source control signal is configured to control an intensity of light emitted by the light source.

6. The optical communication device according to claim 1, wherein, in the second mode, an intensity of light emitted by the light source does not change.

7. The optical communication device according to claim 1, wherein, in the second mode, DC power is supplied to the light source.

8. The optical communication device according to claim 1, further comprising one or more positioning markers located with a proximity to the light source.

9. The optical communication device according to claim 1, wherein the first frequency is greater than or equal to 8000 times/s.

10. A method for transmitting information using a light source, comprising:
    continuously controlling, by a light source control signal, the light source to operate in a first mode or a second mode according to information to be transmitted, the first mode being used to transfer a first information, the second mode being used to transfer a second information different from the first information,
    wherein, in the first mode, the light source control signal has a first frequency so that a stripe presents in a first image of the light source obtained when the light source is photographed by a CMOS image sensor, and in the second mode, a second image of the light source obtained when the light source is photographed by the CMOS image sensor is free from any visible stripe.

11. The method according to claim 10, wherein, in the second mode, the light source control signal has a second frequency different from the first frequency.

12. The method according to claim 11, wherein the second frequency is greater than the first frequency.

13. The method according to claim 10, wherein, in the second mode, an intensity of light emitted by the light source does not change.

14. The method according to claim 10, wherein a sequence of binary data 0 and 1 is transmitted by continuously operating the light source in the first mode or the second mode over time.

15. A method for receiving information transmitted by an optical communication device according to claim 1, comprising:
    obtaining an image of the optical communication device by a CMOS image sensor;
    determining whether there is a stripe in a portion of the image corresponding to the light source; and
    determining, according to the presence or absence of the stripe, whether the light source transmits a first information or a second information different from the first information.

16. The method according to claim 15, further comprising obtaining multiple successive images of the light source by the CMOS image sensor; and determining an information sequence consisting of the first information and the second information.

17. The method according to claim 15, wherein the determining whether there is a stripe in a portion of the image corresponding to the light source further comprises:
- identifying, in the image, one or more positioning markers of the optical communication device;
- determining, based on positions of the one or more positioning markers, the portion of the image corresponding to the light source; and
- determining whether there is a stripe in the portion.

18. An optical communication device, comprising:
at least one light source; and
a controller configured to continuously control, by a light source control signal, each of the at least one light source to operate in at least two modes, the at least two modes comprising a first mode and a second mode, wherein the first mode is used to transfer a first information, and the second mode is used to transfer a second information different from the first information, wherein, for any one of the at least one light source, in the first mode, the light source control signal has a first frequency so that a first stripe presents in a first image of the light source obtained when the light source is photographed by a CMOS image sensor, and in the second mode, the light source control signal has a second frequency so that a second stripe different from the stripe in the first mode presents in a second image of the light source obtained when the light source is photographed by the CMOS image sensor.

19. The optical communication device according to claim 18, wherein the first frequency is the same as the second frequency, and wherein a first color of light emitted by the light source in the first mode is different from a second color of light emitted by the light source in the second mode.

20. The optical communication device according to claim 18, wherein the at least two modes further comprise a third mode used to transfer a third information different from both the first information and the second information, and in the third mode, no strip presents a third image of the light source obtained when the light source is photographed by the CMOS image sensor.

* * * * *